No. 717,647. PATENTED JAN. 6, 1903.
J. WILLMANN.
PIPE COUPLING.
APPLICATION FILED MAR. 8, 1902.
NO MODEL.
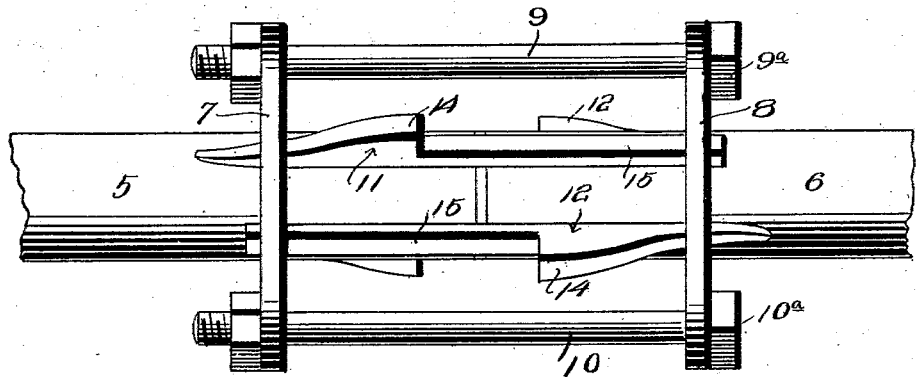
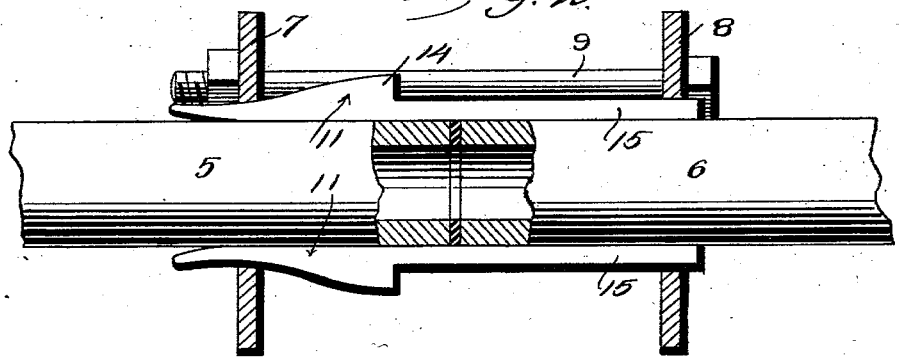
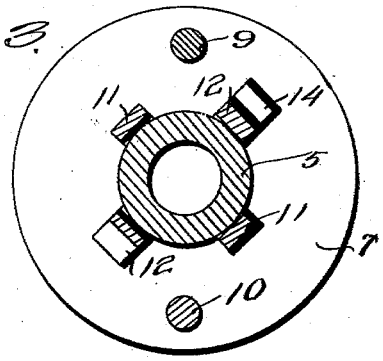
Witnesses
Joseph Willmann, Inventor.
Attorneys

UNITED STATES PATENT OFFICE.

JOSEPH WILLMANN, OF NEW BRAUNFELS, TEXAS.

PIPE-COUPLING.

SPECIFICATION forming part of Letters Patent No. 717,647, dated January 6, 1903.

Application filed March 8, 1902. Serial No. 97,345. (No model.)

*To all whom it may concern:*

Be it known that I, JOSEPH WILLMANN, a citizen of the United States, residing at New Braunfels, in the county of Comal and State of Texas, have invented a new and useful Pipe-Coupling, of which the following is a specification.

This invention has for its object to produce a device whereby the abutting ends of two pipes may be coupled or connected without the necessity of forming threads thereon; and the invention consists in the improved construction, arrangement, and combination of parts, to be hereinafter more fully described, whereby the coupling or connecting of pipes may be speedily and effectively performed.

In the accompanying drawings, Figure 1 is a side elevation showing two joints of pipe connected by my improved coupling. Fig. 2 is a sectional side elevation of the same. Fig. 3 is a transverse section taken on a plane intermediate the heads or disks of the coupling.

Corresponding parts in the several figures are indicated by like characters of reference.

5 and 6 designate the ends of two sections or joints of pipe connected by my improved coupling. The latter comprises in its make up two disks or heads 7 and 8, having central apertures whereby they are fitted upon the ends of the pipes to be connected and provided with additional apertures to receive connecting-bolts 9 and 10, having nuts 9ª and 10ª, whereby the said disks or heads may be forced in the direction of each other. Any desired number of connecting-bolts may be used; but only two have been shown in the drawings, inasmuch as this number will be usually found sufficient. Each of the disks is provided with radial recesses or cavities, as 4, extending outwardly from their inner peripheries, said recesses or cavities being practically nothing more than notches, all of which are of substantially the same size and shape, so that the disks may be reversed or transposed without interfering with the utility of the device.

11 and 12 designate bars rectangular in cross-section, so as to fit in the notches 4, and provided at one of their ends with wedge-shaped projections, (designated 14 and 15.) It will be observed that the construction of these elements, which may be described as "wedge bars," is identical and that they have been referred to by different numerals only in order to distinguish their relative disposition, as will be presently seen.

The disks which form the heads or ends of the coupling may be provided with any desired number of notches 4. When the disks are to be used upon small pipes, four will usually be found sufficient. Upon larger pipes six, eight, or even a larger number may be used. It will be observed, however, that the number of notches should always be even in order to enable the wedge-bars to be properly disposed; also that the said notches will naturally be formed equidistantly from each other.

In the carrying out of my invention one of the disks is adjusted upon each of the pipe-sections to be united near the end of the same, and the wedge-bars are then adjusted in the notches of said disks, with their wedge-shaped ends alternately pointing in opposite directions. Thus when the wedges are driven lightly home in the notches of the opposing disks the parts of the device will be temporarily held upon the pipes which are thus loosely connected. A washer 24 should be previously inserted between the meeting ends of the pipes, as shown. The bolts connecting the disks are now placed in position and the nuts tightened thereon. The tendency will now be for the disks to move in the direction of each other and to engage the wedges of the reversely-disposed wedge-bars, each disk thus obtaining through the medium of the engaging wedge-bars a very firm grip upon the adjacent pipe-section. When the disks are engaged by the wedges so solidly that each disk will be incapable of further movement longitudinally upon the pipe-section upon which it is mounted, a continued tightening of the nuts will result in forcing the abutting ends of the pipe-section very tightly together and into contact with the interposed packing, thus forming an absolutely tight and very durable joint.

It will be observed that the wedge-bars, which are clamped by the disks upon each pipe-section, while incapable, as well as the engaging disk, of further longitudinal movement with relation to the pipe-section upon which they are clamped, are in no wise restrained from longitudinal movement with relation to the opposing pipe-section, the plain portions of said bars having a free sliding movement in the notches of the disks, whereby they are held in contact with the outer side of said opposing pipe-section. Hence a joint of any desired degree of tightness may be obtained.

Having thus described my invention, I claim and desire to secure by Letters Patent of the United States—

1. In a pipe-coupling, the combination of two disks and two sets of wedges clamped by said disks upon two opposing pipe-sections, those upon one section being disconnected from those upon the other pipe-section, and means for forcing said disks, wedges and pipe-sections toward each other.

2. A pipe-coupling comprising disks loosely engaging opposing pipe ends, wedges engaging said disks and serving to clamp each disk upon its pipe-section independent of the other disk and pipe-section, extensions of the wedges upon each pipe-section having sliding engagement with the opposite pipe-section, and connecting means whereby the disks and the pipe-sections wedged therein may be forced in the direction of each other, substantially as set forth.

3. A pipe-coupling comprising disks loosely engaging opposing pipe ends, wedge-bars engaging said disks and serving to clamp each disk upon its pipe-section independent of the other disk and pipe-section, and means for forcing said disks and the pipe-sections connected therewith in the direction of each other, substantially as set forth.

4. A pipe-coupling comprising disks mounted upon opposing pipe-sections and having notches therein, wedges engaging alternate notches in each disk and having extensions slidingly engaging alternate notches in the disk upon the opposing pipe-section, and connecting means whereby the disks and the pipe-sections wedged therein may be forced in the direction of each other, substantially as set forth.

5. A pipe-coupling comprising a series of wedge-bars each having a wedge-shaped projection on one end thereof, disks having central apertures and notches in their inner peripheries, and connecting-bolts, the said disks being mounted upon opposing pipe-sections, and the said wedge-bars being alternately reversely disposed in the notches of the disks, whereby, by tightening the bolts, the disks shall be clamped upon the pipe-sections and the latter be forced in the direction of each other, substantially as set forth.

6. A pipe-coupling comprising a pair of disks having openings to receive the pipes, and radial notches, and bars engaging said notches of one disk and having wedges engaging corresponding notches of the opposite disk, and connecting means, substantially as set forth.

7. A pipe-coupling comprising a pair of disks having openings to receive the pipes, and radial notches, bars engaging said notches of one disk and having alternately oppositely disposed wedges engaging corresponding notches of the opposite disk, and connecting means, substantially as set forth.

8. A pipe-coupling comprising a pair of disks having openings to receive the pipes, alternately oppositely disposed wedges engaging radial notches in said disks and having longitudinal guide-bars extending through notches in the opposite disks, and connecting means whereby the said disks may be forced in the direction of each other, substantially as set forth.

9. The herein-described means for connecting the ends of pipes, the same comprising a series of bars lying flat against the adjacent pipe-sections and provided with wedges alternately at opposite ends, disks mounted loosely upon the adjacent pipe-sections and having radial notches engaging the opposite ends of the said bars, each bar being extended at its opposite ends through corresponding notches in said disks, and connecting means whereby the said disks may be forced in the direction of each other, substantially as set forth.

In testimony that I claim the foregoing as my own I have hereto affixed my signature in the presence of two witnesses.

JOSEPH WILLMANN.

Witnesses:
JOHN MARBACH,
A. STRATEMANN.